March 6, 1928.  
F. T. IRGENS  
SWIVEL MOTOR  
Filed Sept. 20, 1926  
1,661,369  
2 Sheets-Sheet 1

Inventor:
Finn T. Irgens

By
Attorneys.

March 6, 1928.  1,661,369

F. T. IRGENS

SWIVEL MOTOR

Filed Sept. 20, 1926   2 Sheets-Sheet 2

Inventor:
Finn T. Irgens
By
Attorneys.

Patented Mar. 6, 1928.

1,661,369

UNITED STATES PATENT OFFICE.

FINN T. IRGENS, OF JACKSON, MICHIGAN, ASSIGNOR TO LOCKWOOD ASH MOTOR COMPANY, OF JACKSON, MICHIGAN, A CORPORATION OF MICHIGAN.

SWIVEL MOTOR.

Application filed September 20, 1926. Serial No. 136,519.

This invention relates to new and useful improvements in outboard motors for small boats of the type commonly known as swivel motors wherein the angular movement of the motor and propeller shaft is utilized to steer the boat.

One of the chief disadvantages attributed to the present swivel motors is the tendency of the motor to change its position when the operator takes his hand away from the tiller or steering handle.

In some devices of this class, there is provided an ordinary clamping sleeve about the casing of the driving shaft. Inasmuch as such sleeve must be set considerably tight to have any appreciable effect in counteracting the torque vibration, the steering operation is made extremely difficult, and undesirable vibration is transferred to the hull. Other motors have positive locking means for different steering positions which also operate to transfer the vibration directly to the hull.

The principal object of the present invention is to eliminate these disadvantages without impairing the general efficiency of the swivel motor.

Other objects of the invention will appear hereinafter.

Figure 1:
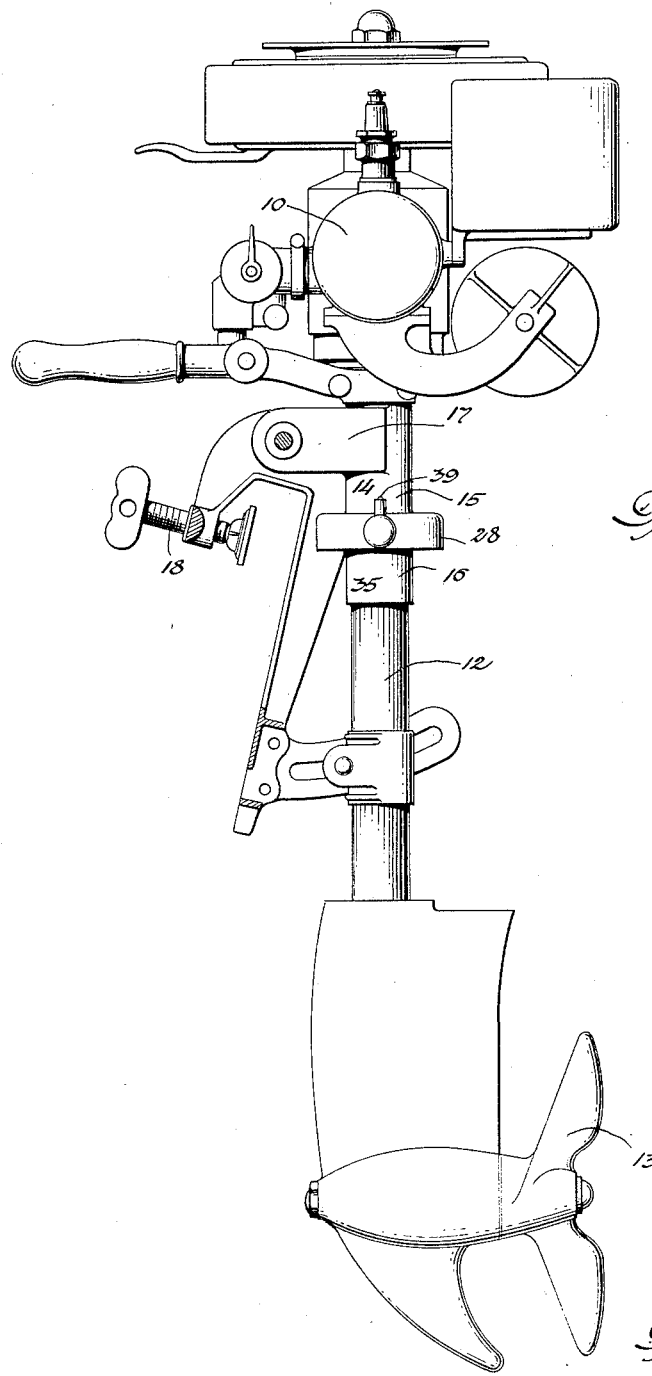
Figure 1 is an elevation view of an outboard motor including driving and propelling means for small boats, and showing the invention applied thereto.

Referring now to the drawing:—the numeral 10 designates the motor so mounted as to drive the vertical drive shaft 11 encased within the tubular shaft 12, and suspending the driving gear casement carrying the propeller 13. Said shaft is preferably supported in a support 14, composed of an upper part 15 and a lower part 16, said upper part formed with a lateral extension 17 upon which is pivotally supported the adjustable attaching clamp 18 whereby drive shaft 11 is maintained in vertical position irrespective of the inclination of the body upon which it may be mounted.

The lower part 16, preferably comprises a split cylindrical sleeve having a yieldable engagement with the tubular shaft 12. The split ends of the sleeve have lateral arms 20 and 21, arm 20 being formed with a cylindrical opening 22 provided with a bolt hole 23 in the bottom thereof; arm 21 being apertured and threaded as indicated at 24 to receive the threaded end of bolt 25 which retains a coil spring 25$^a$ within said opening in the upper arm, said spring being arranged in the opening 22 to hold the sleeve against the shaft 12 under an adjustable spring tension.

On the opposite side of the sleeve 16 is formed a lug 26 preferably positioned in a plane higher than that of said arms, and provided with a bore 27. The upper part 15 comprises a cylindrical sleeve formed with an outward and downwardly directed flange 28, having an upper internal shoulder 29, and a lower internal flange 30 to provide means for holding in position locking wires 31.

At a suitable point on the periphery of the said flange, there is provided an inwardly extending projection 32, which has a transverse bore 33 to receive a bolt 35, the inner end of which being adapted to engage within said bore 27.

Said bolt is formed with a pair of spaced annular grooves 36 and 37. Passing across bore 33 there is another bore 38 formed in the projection 32 having its upper end counterboard and screw-threaded, and adapted to house a detent, such as a spring pressed ball held in position by an adjustable screw 39, said detent engageable as desired with either groove 36 or 37 to keep the bolt in or out of the bore 27.

Figure 2:
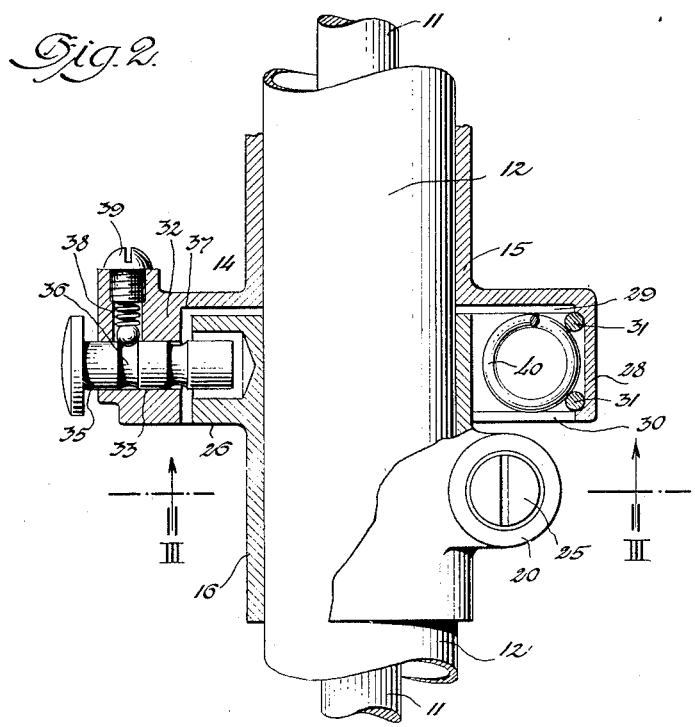
Fig. 2 is an enlarged longitudinal sectional view of the deflector compensating device.
Figure 3:
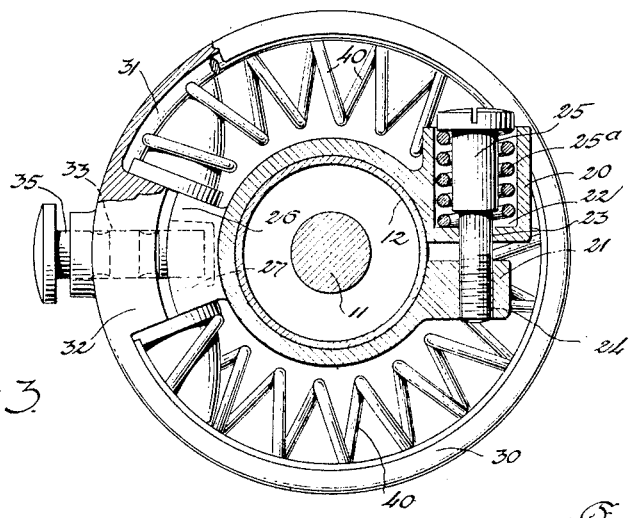
Fig. 3 is an enlarged cross sectional view of the same taken on the line 3—3 of Fig. 2.

A coil spring 40 is suitably nested within said flange and held in position by said locking wire as shown in Figures 2 and 3, said spring being interposed between the upper fixed part and the lower movable part.

When a swivel motor is allowed to vibrate freely about its axis an amount equal to the natural amplitude of its torque vibration, a minimum force is necessary to hold the motor in fixed position. It is upon this principle that the present invention is based.

In operation, with the split sleeve 16 held in fixed position shown in Figure 3 by bolt 85 extending within the bore 27, tubular shaft 12 as it is moved during the steering operation, slips inside the sleeve to the new position desired, and is held there by the friction between the contacting surface of the tube 12 and sleeve 16.

The lug 26 of the sleeve interposed between the ends of spring 40 is free within the limits of the looseness of bolt 35 within the bore 27 to vibrate, and thus provision is made to care for the torque vibration which otherwise would tend to cause the motor "crawl around." Spring 40 pressing against the sides of lug 26 and projection 32 acts to cushion the vibration impulses in the tubular shaft and prevents any undesirable chattering noise.

The motor due to the friction of the sleeve 16 around the shaft 12 will remain in any position in which it is placed, and the tendency of the motor to creep is thus entirely eliminated, since the torque vibration is permitted to take place uninterruptedly except for the action of the spring 40. In order for the spring 40 to return the motor to its original position, the screw 25 must first be tightened, otherwise, the sleeve 16 might slip on casing 12. To lock the motor in any desired position, the bolt 35 must be in hole 27.

With the bolt 35 withdrawn from the bore 27 of the lug 26, the motor can be swung around its axis as far as the coil spring 40 will permit, providing a positive means of returning the motor to its original position.

Again, by tightening the screw 25 the motor may be locked in any desired position.

From the forgoing, it will readily be seen that there has been provided a very effective device for dampening out torque vibration in outboard motors, which permits the motor to stay in any position it is moved to assume, and which does not involve any extensive changes in construction.

Modifications of the above may be made within the spirit and scope of the invention.

What I claim is:—

1. A deflection compensating device for outboard motors including a support for the supporting shaft of the motor comprising a fixed part and a movable part which yieldably grips said shaft, and resilient means interposed between said parts to cushion the vibration of the motor.

2. A deflection compensating device for outboard motors including a support for the supporting shaft of the motor comprising a fixed part and a movable part which yieldably grips said fixed part and resilient means interposed between said movable part and said supporting shaft.

3. In a support for outboard motors consisting of two parts, one movable and the other stationary, a rudder post supporting the motor yieldably held in said movable part and supported therein, a spring interposed between said parts, and means to hold said movable part in comparatively fixed position with respect to said fixed part.

4. In an outboard motor and driving mechanism, a deflection and vibration compensator device, consisting of a rotative post, a stationary member, adapted to sustain the weight of said mechanism, and a third member held in yielding frictional contact with first named member, and loosely connected to said stationary member.

5. In an outboard motor and driving mechanism, a deflection and vibrating compensator device consisting of the rotative post, a stationary member, adapted to sustain the weight of said mechanism, and a third member held in yielding frictional contact with said stationary member and loosely connected to first named member.

6. In an outboard motor, the combination with a shaft, of a stationary supporting member, and a sleeved member having a frictional contact with one, and having a limited angular movement in relation to the other of the said members.

7. In an outboard motor the combination with the shaft, of a stationary supporting member and a sleeved member having a frictional contact with one, and having limited angular movement in relation to the other of the said members, and means to cushion said angular movement.

8. In an outboard motor, the combination with a motor supporting shaft, of a stationary member to support said shaft, a rotative member relatively movable with said shaft, means to connect the members loosely together, and yieldable means between the two members to cushion the vibration and prevent chatter in the connection between said parts.

9. In an outboard motor, the combination with a motor supporting shaft, of a stationary member to support said shaft, a rotative member movable with said shaft and yieldably mounted thereon, removable means to loosely connect together the said parts whereby said movable member is held fixed during the steering operation and the supporting shaft is caused to slip therein.

10. In an outboard motor, the combination with a supporting post, of a stationary sleeve extending about the shaft and adapted to support the motor, an internal projecting lug formed upon the interior of the flange of said sleeve, another sleeve yieldably engaging said shaft and movable with said shaft, an apertured projection formed upon the periphery of the last named sleeve, a bolt removably carried in the lug of the stationary member and adapted to loosely engage within said apertured projection, and a coil spring carried by said stationary sleeve having its ends bearing against the sides of said lug and projection whereby vibration is effectively cushioned.

11. In combination with the rotatable steering sleeve of a motor mounted for bodily adjustment on a pivotal axis, a member fixed relatively to said sleeve and motor, a clamping member adapted for a slip connection with said sleeve, a centering device between said fixed member and clamping member, and means for limiting the movement of said clamping member relatively to said fixed member.

In testimony whereof I affix my signature.

FINN T. IRGENS.